United States Patent [19]

Fork et al.

[11] 4,393,345
[45] Jul. 12, 1983

[54] CIRCUIT FOR DAMPING HUNTING BY ELECTRIC MACHINES

[75] Inventors: Kurt Fork, Neunkirchen; Wolfgang Kaufhold; Wolfgang Meusel, both of Erlangen; Hermann Waldmann, Weiher, all of Fed. Rep. of Germany

[73] Assignee: Siemens Aktiengesellschaft, Munich, Fed. Rep. of Germany

[21] Appl. No.: 199,685

[22] Filed: Oct. 22, 1980

[30] Foreign Application Priority Data

Nov. 12, 1979 [DE] Fed. Rep. of Germany ....... 2945599

[51] Int. Cl.³ .......................... H02H 7/06; H02P 9/00
[52] U.S. Cl. ...................................... 322/19; 73/650; 322/29; 322/58; 361/20
[58] Field of Search ..................... 322/17–25, 322/29–32, 58; 361/20, 21; 73/650, 660

[56] References Cited

U.S. PATENT DOCUMENTS

| 4,080,559 | 3/1978 | Wright et al. | 322/32 X |
| 4,317,371 | 3/1982 | Wolfinger | 73/660 X |
| 4,329,637 | 5/1982 | Kotake et al. | 322/20 |

Primary Examiner—R. J. Hickey
Attorney, Agent, or Firm—Kenyon & Kenyon

[57] ABSTRACT

A circuit for damping hunting oscillations of controlled electric machines. The circuit is provided with a measuring circuit for determining the hunting oscillations and an identifier circuit for determining the angle components of such hunting oscillations. A phase shifter circuit is provided for receiving the angle components produced by the identifier circuit and forming a hunting oscillation correction signal which is shifted in phase from the hunting oscillations by a predetermined phase angle. The hunting oscillation correction signal is conducted to a control unit of the electric machine. The invention is particularly useful in damping hunting by the rotors of voltage controlled synchronous generators.

10 Claims, 5 Drawing Figures

CIRCUIT FOR DAMPING HUNTING BY ELECTRIC MACHINES

BACKGROUND OF THE INVENTION

This invention relates generally to synchronous electric machines, and more particularly, to a circuit for damping rotational oscillations resulting from hunting by synchronous electrical generators.

It is a characteristic of synchronous machines which are operated as motors or generators, that the spatial relationship between a magnetic field which rotates along a stator, and a magnetic field which rotates with a rotor, is a function of the load on the machine. For example, a lightly-loaded synchronous machine which is operating as a motor requires only a small electromagnetic torque to maintain synchronism between the rotation of the rotor and the rotation of the stator field. If the mechanical loading of the motor shaft is increased, the rotor must retard in space phase so as to assume a spatial phase angle which approaches ninety degrees, at which angle maximum torque is produced. Since the rate of rotation of the magnetic field of the stator is constant for a given line frequency, the rotor must temporarily vary its speed so as to achieve a new spatial phase angle which corresponds to the desired torque output. This search by the rotor for a new space-phase position is called "hunting."

In voltage-regulated synchronous generators which are connected in parallel with transmission networks as loads, magnetic rotor wheel hunting can result from the effects of switching processes or other disturbances in the network. In addition to network disturbances, hunting in synchronous generators may be produced by the application of an uneven driving torque, such as that produced by a diesel engine, which may cause the position of the generator rotor periodically either to lead or lag with respect to the optimum space-phase orientation between the rotor and stator. Thus, hunting in synchronous electric machines may be produced by a variety of disturbances, affecting either the electrical or mechanical loads.

It is, therefore, an object of this invention to provide a circuit of reducing hunting in electric machines.

SUMMARY OF THE INVENTION

The foregoing and other objects are achieved by this invention which provides circuitry for detecting hunting oscillations, and circuitry for determining the phase angle components of the hunting oscillations. Phase shifting circuitry which is responsive to the angle components of the oscillation is provided for forming a correction signal in the form of an oscillation which is phase-shifted by a predetermined angle. The correction signal is conducted to a responsive control circuit of the machine.

This invention is premised upon the concept that hunting can be considered to be an oscillation which can be compensated by a phase-shifted correction oscillation signal which is added to the control of the machine. The occurrence of hunting is first determined by power measuring circuitry which produces an oscillating output signal when hunting is present. Such an output signal is conducted to circuitry for identifying the angular component of the hunting oscillations. A signal corresponding to such angular components is conducted to a phase shifter which produces the desired correction signal, which is in the form of an oscillation which is shifted by a predetermined phase angle relative to the identified oscillation. Embodiments of the invention are shown which produce correction signals corresponding to Cartesian and Polar coordinates, respectively.

BRIEF DESCRIPTION OF THE DRAWINGS

Comprehension of the invention is facilitated by reading the following detailed description in conjunction with the annexed drawings in which.

DETAILED DESCRIPTION

Figure 1:
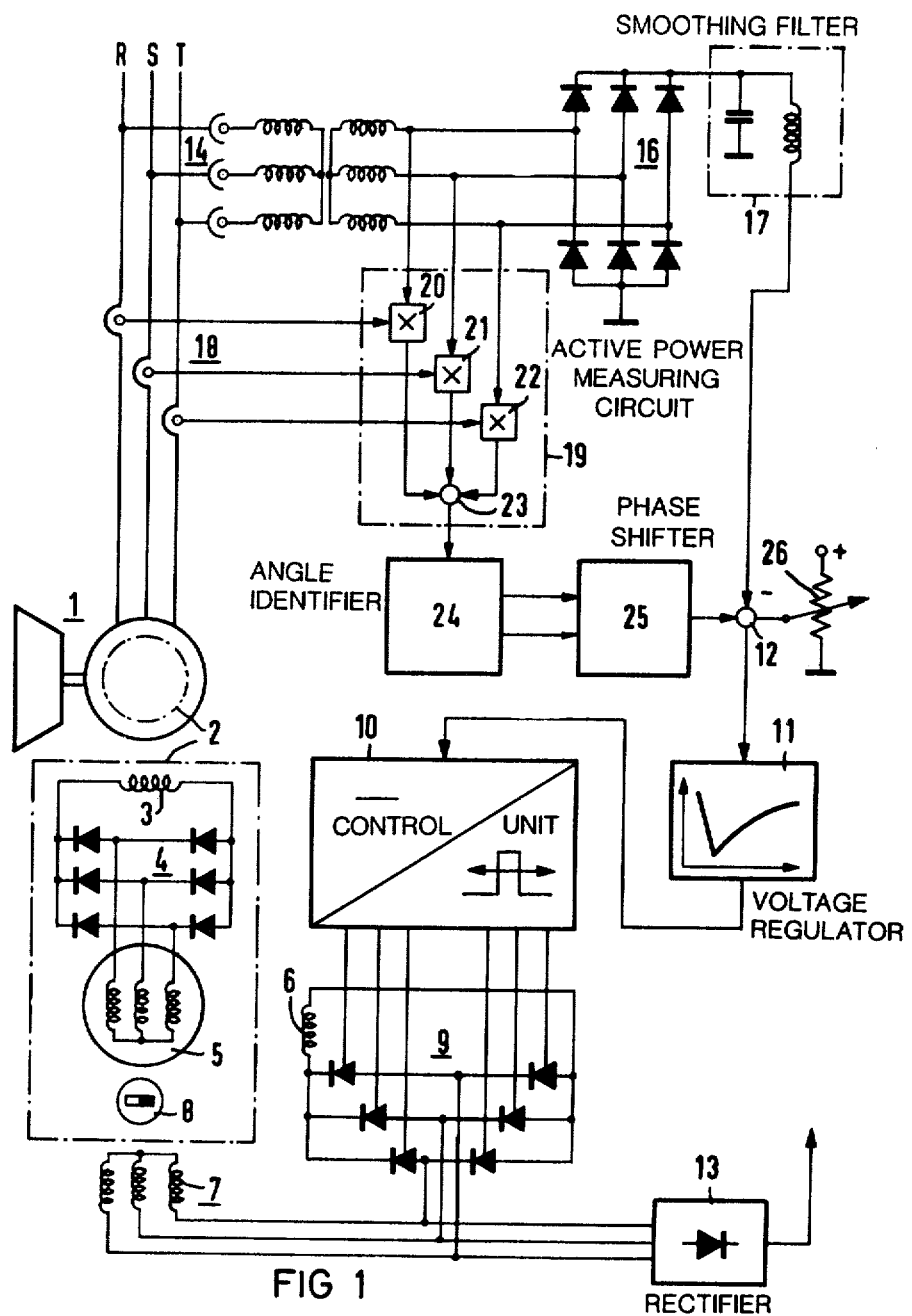
FIG. 1 depicts, partly in block and line representation and partly in schematic form, an embodiment of the invention for controlling hunting of a synchronous generator.

FIG. 1 shows an embodiment of the invention with a turbo-generator combination 1 having a synchronous generator which is provided with brushless excitation and which supplies a transmission network RST. A rotating exciter portion 2 contained within turbo-generator 1 is shown in further detail in a dash-dotted block. Rotating exciter 2 contains a main field winding 3 which is electrically energized by a rotating converter 4. Rotating converter 4 may be of a controlled or uncontrolled type and is comprised of diodes which are connected in pairs for each phase. In this embodiment, a three-phase machine is shown wherein the cathode-anode junction of each diode pair in rotating converter 4 is connected to a respective winding of a rotating armature 5. Rotating armature 5 is part of a main exciter portion of the electric machine and is excited by a field winding 6 which is arranged in a stator (not shown). Field winding 6 receives electrical energy from an auxiliary three-phase exciter portion of the machine (not specifically identified), having a three-phase winding 7 which is arranged in the stator. Winding 7 operates in conjunction with a permanent-magnet rotor 8. The three-phase winding 7 of the auxiliary exciter portion supplies electrical current to field winding 6, which is located in the stator of the main exciter portion. A thyristor set 9 converts the electric energy from three-phase winding 7 into a variable DC current in response to control signals from a control unit 10 for the excitation of the main exciter portion of the machine. In addition, three-phase winding 7 supplies, by means of a rectifier circuit 13, control unit 10 and the additional electronic circuitry which will be described hereinbelow. The corresponding electrical connections between rectifier circuit 13 and such additional electronic circuitry is not shown, to preserve the clarity of the drawing.

Control unit 10 controls the conductive states of the thyristors in thyristor set 9 in response to a control voltage which is received from a voltage regulator 11 having a predetermined transfer characteristic. Voltage regulator 11 receives an input voltage from a comparator 12 which compares the actual voltage of the transmission network to a preset reference value which is established by potentiometer 26. A signal corresponding to the actual voltage value of the transmission network is obtained by a voltage transformer arrangement 14 which is connected to each of the phase conductors of the network RST. Such voltages are rectified in a rectifier circuit 16 and smoothened by a smoothing filter 17.

The circuitry shown in the figure further contains a power measuring circuit 19 for measuring the power delivered to the network, an identifier circuit 24, and a phase shifter circuit 25. The output of the phase shifter circuit 25 is conducted to an input of comparator 12. Power measuring circuit 19 contains three multiplier circuits 20, 21, and 22, each of which multiplies a respective current value measurement signal obtained from one of the current transformers in a current transformer arrangement 18 by a corresponding voltage value measurement signal obtained from voltage transformer arrangement 14. The output signals of multipliers 20, 21, and 22 are summed in a summing circuit 23. In a symmetrical, steady state condition wherein the phase conductors RST each conduct equal power, the output signal of summing circuit 23 is a constant quantity which does not contain harmonics, and is a measure of the power delivered into the network by the synchronous generator. However, if hunting occurs in the generator, a corresponding oscillation is produced at the output of summing circuit 23.

Figure 2:
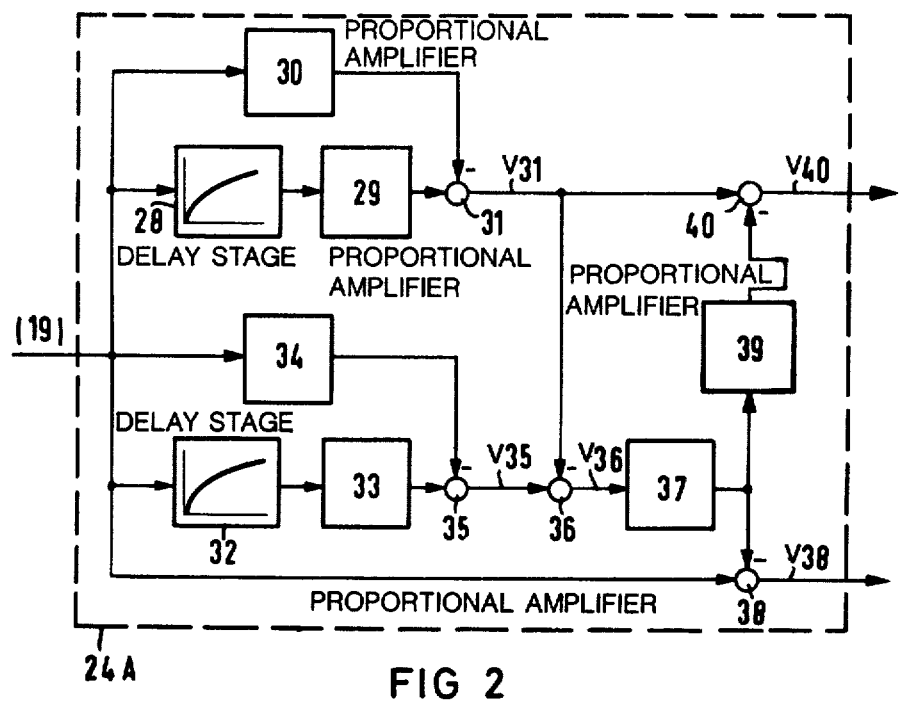
FIG. 2 is a block and line representation of a vector identifier circuit.
Figure 3:
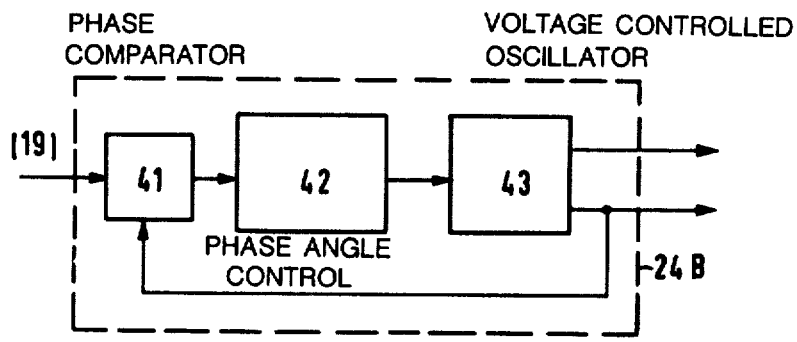
FIG. 3 is a block and line representation of a vector filter.
Figure 4:
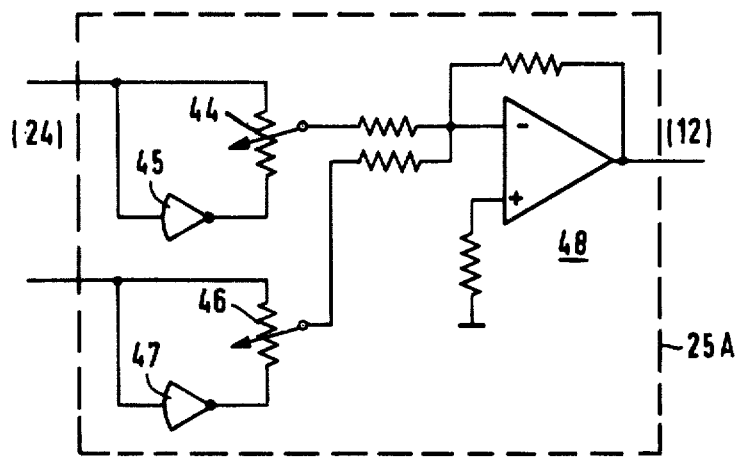
FIG. 4 is a schematic representation of a phase shifter circuit for Cartesian coordinates.
Figure 5:
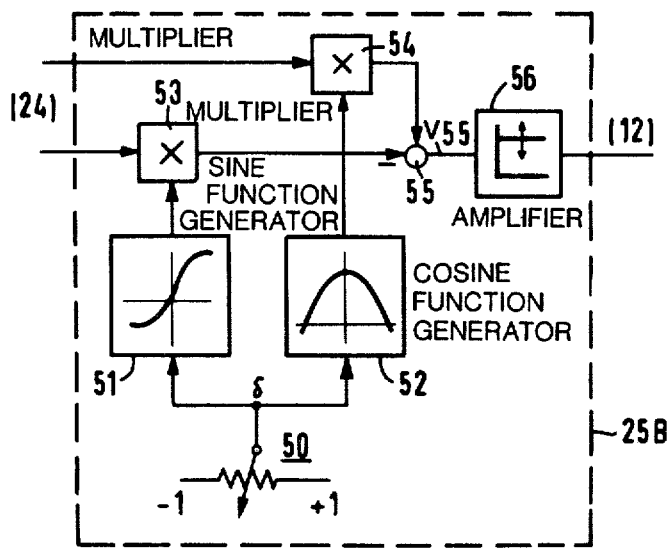
FIG. 5 is a block and line representation of a phase shifter circuit for Polar coordinates.

The output signal of summing circuit 23 in power measuring circuit 19 is conducted to identifier circuit 24 which determines the sine and cosine angle components of the oscillations of the rotor in the generator. Angle identifier 24 may be configured advantageously as either a vector identifier, as shown in FIG. 2, or as a vector filter, as shown in FIG. 3. The angle components of the hunting oscillations of the generator rotor are converted by phase shifter circuit 25 into a correction oscillation signal which is shifted with respect to the output signal of the angle identifier 24 by a predetermined phase angle. As indicated, the correction oscillation signal produced by phase shifter circuit 25 is conducted to a non-inverting input of comparator 12. Phase shifter circuit 25 may be advantageously configured to operate in Cartesian coordinates, as shown in FIG. 4, or in Polar coordinates, as shown in FIG. 5.

In some embodiments of the invention, the hunting oscillations of the generator rotor may be determined directly by a suitable rotor position transmitter which is arranged on the shaft of the electric machine. Such a rotor position transmitter would eliminate the need for determining the oscillations by a power measuring element, and would produce a signal which can be conducted to the angle identifier circuit directly. Suitable rotor position transmitters are known in the art of rotating-field electric machines. The correction oscillation signal of phase shifter circuit 25 can be applied directly to the output of voltage regulator 11. Such a modified circuit would be operative so long as the control signals which are delivered from control unit 10 to thyristor set 9 are of such polarity that the correction oscillation signal causes damping of the hunting oscillations of the magnet wheel.

The identification of the angle components of the magnet wheel oscillation can be achieved by a technique known as vector identification. Since the output signal of power measuring element 19 contains the oscillation signal component which corresponds to the hunting oscillations of the generator rotor, and a steady-state component corresponding to the active power delivered to the network by the turbo-generator 1, a vector identifier circuit which eliminates the steady-state component is used. One suitable vector identifier circuit is known from Siemens Forsch.—u. Entwickl. Ber. Vol. 6 (1977), pp. 29 to 38, Springer-Verlag Berlin, Heidelberg, N.Y.

FIG. 2 shows a block and line representation of a vector identifier 24A which eliminates the steady-state component in the input signal. Vector identifier 24A is connected at its input to an output terminal of power measuring circuit 19 of FIG. 1, which produces a steady-state voltage with a superimposed oscillation signal component corresponding to the hunting oscillations of the generator rotor. The input signal of the vector identifier 24A can be described by:

$$P = A \cos \omega_p t + b \tag{1}$$

where:
P = network power;
A = amplitude of the oscillation;
$\omega_p$ = angular frequency of the oscillation;
t = time;
b = steady state component of network power.

Vector identifier 24A contains two subordinate vector identifiers, each with a different time constant from the other, each such subordinate vector identifier receiving the input signal defined by equation 1. The first subordinate vector identifier contains a delay stage 28 having a first time constant which causes a first predetermined phase shift. Delay stage 28 causes a phase shift by an angle α at the frequency of oscillation, and is connected at its output to a proportional amplifier 29 having a gain $G_{29}$ which corresponds to:

$$G_{29} = \cot \alpha / \cos^2 \alpha \tag{2}$$

The input signal of Equation 1 is further conducted to a proportional amplifier 30 having a gain $G_{30}$ which corresponds to:

$$G_{30} = \cot \alpha \tag{3}$$

The output signal of proportional amplifier 30 is subtractively combined with the output signal of proportional amplifier 29 in a comparator 31. Output signal $V_{31}$ of comparator 31 corresponds to:

$$V_{31} = A \sin \omega_p t + b \tan \alpha \tag{4}$$

The second subordinate vector identifier contains a delay stage 32 having a second predetermined time constant so as to cause a phase angle β at the oscillation frequency. Delay stage 32 is connected at its output to a proportional amplifier 33 which has a gain $G_{33}$ which corresponds to:

$$G_{33} = \cot \beta / \cos^2 \beta \tag{5}$$

The input signal to vector identifier 19 is also conducted to a proportional amplifier 34 having a gain of $G_{34}$ which corresponds to:

$$G_{34} = \cot \beta \tag{6}$$

The output signal of proportional amplifier 34 is subtracted from the output signal of proportional amplifier 33 at a comparator 35 which produces an output signal corresponding to:

$$V_{35} = A \sin \omega_p t + b \tan \beta \qquad (7).$$

A further comparator 36 receives at inverting and non-inverting inputs the output signals of comparators 31 and 35, respectively, and produces an output signal $V_{36}$ which corresponds to:

$$V_{36} = b(\tan \beta - \tan \alpha) \qquad (8).$$

Output signal $V_{36}$ is conducted to a proportional amplifier 37 having a gain $G_{37}$:

$$G_{37} = 1/(\tan \beta - \tan \alpha) \qquad (9).$$

The output signal of proportional amplifier 37 corresponds to the steady-state network power component b. This output signal is conducted to a proportional amplifier 39 having a gain $G_{39}$:

$$G_{39} = \tan \alpha \qquad (10).$$

The output signal of proportional amplifier 39 is subtracted from the output signal $V_{31}$ of the first subordinate vector identifier, in a comparator 40 which produces an output signal $V_{40}$ which corresponds to the sine component of the oscillation in accordance with:

$$V_{40} = A \sin \omega_p t \qquad (11).$$

The output signal of proportional amplifier 37 is subtracted from the input signal to vector identifier 19 (Equation 1) in a comparator 38 which produces an output signal $V_{38}$ which represents the cosine component of the oscillation in accordance with:

$$V_{38} = A \cos \omega_p t \qquad (12).$$

Thus, vector identifier 24A produces output signals corresponding to the sine and cosine angle components of the hunting oscillations according to Equations 11 and 12. The vector identifier described above with respect to FIG. 2 is advantageous if the frequency of the oscillation can be considered to be approximately constant.

FIG. 3 shows a vector filter 24B which can be used instead of vector identifier 24A. Such a vector filter is described in detail in a dissertation by Felix Blaschke, "The Field Orientation Method for Controlling Rotating-Field Machines," Technical University Braunschweig, 1974. Vector filter 24B contains a voltage-controlled oscillator 43 which supplies at its outputs two oscillations which are shifted ninety degrees (90°) with respect to one another and can be considered to be the angle components of the magnet wheel oscillations. The cosine component of the oscillation at one output of oscillator 43 is compared in a phase comparator 41 with the input signal from power measuring circuit 19. The output signal of phase comparator 41 corresponds to a phase difference between the cosine component output of voltage controlled oscillator 43 and power measuring circuit 19. This output signal is conducted to a phase angle control 42 which supplies a control voltage to the voltage controlled sine-cosine oscillator 43. Thus, the cosine component of the oscillations is regulated for phase equality. This vector filter has the advantage of being operable at different frequencies and is therefore used preferably in applications where the frequency of oscillations is variable.

FIG. 4 shows a phase shifter circuit 25A which produces a phase shift of the identified oscillation in the form of Cartesian coordinates. Phase shifter circuit 25A receives at its inputs the angle components of the oscillations from identifier circuit 24, in FIG. 1. The phase shifter circuit is provided with two potentiometers 44 and 46, and a summing amplifier stage 48. Potentiometer 44 is connected at one terminal directly to the signal corresponding to an angle component of the identified oscillations, and its other end terminal is connected to the same angle component signal by means of an inverting amplifier 45. Potentiometer 45 is connected at one end terminal to the signal corresponding to the other angle component of the identified oscillations, and its other end terminal is connected to the same angle component by means of an inverting amplifier 47. The sliding contacts of the two potentiometers are combined by resistors at an inverting input of summing amplifier 48 so as to be added to one another and thereby form the desired correction oscillation signal. For example, if both sliding contacts are in the upper end positions, a correction oscillation signal is obtained which is shifted 45° with respect to the identified oscillations. By varying the position of the sliding contacts, any desired phase shift may be obtained. It is, therefore, possible to adjust optionally the stabilizing correction signal.

FIG. 5 shows a phase shifter circuit 25B which produces a phase shift of the identified oscillations, corresponding to Polar coordinates. In this embodiment, the phase shift and the amplitude of the correction oscillation signal may be separately adjusted. The advantageous variability of the phase shift and amplitude parameters facilitates optimization of the oscillation damping in some embodiments. Phase shifter circuit 25B contains a sine function generator 51 and a cosine function generator 52 which are each connected at their inputs to the sliding contact of a potentiometer 50. The end terminals of potentiometer 50 are connected to voltages which represent the values positive 1 and negative 1. The voltage at the sliding contact of potentiometer 50 represents the desired angle of rotation δ. The output voltage of the function generator 51 is, accordingly, the sine component of the desired angle of rotation δ, and the output voltage of the function generator 52 is the cosine component of the desired angle of rotation. The sine component of the identified oscillation according to equation 11 is multiplied by the sine component of the desired angle of rotation δ in a multiplier 53. The cosine component of the identified oscillation according to Equation 12 is multiplied by the cosine component of the angle of rotation δ in a multiplier 54. The output signal of multiplier 53 is subtracted from the output signal of multiplier 54 in a comparator 55 which produces at its output a signal $V_{55}$ which corresponds to:

$$V_{55} = A \cos \omega_p t \cos \delta - A \sin \omega_p t \sin \delta \qquad (13).$$

The output voltage of comparator 55 is conducted to a proportional amplifier 56 which has adjustable gain. The output voltage of proportional amplifier 56 is conducted to comparator 12 in FIG. 1. The phase shifter circuit 25A of FIG. 4 produces a desired phase shift by the advantageous adjustment of potentiometers 44 and 46. The phase shifter circuit 25B of FIG. 5, on the other hand, achieves a desired phase shift by the advantageous adjustment of potentiometer 50. Ordinarily, it is possible to determine by tests or by calculations the appropriate settings of the potentiometers so that hunting oscillations are satisfactorily damped for all operating states. Additionally, it is possible to optimize the damping of the oscillations by determining the preset angle with a phase shifter circuit in view of load conditions of the machine, or as a result of analysis of hunting oscillations. It may be advantageous in some embodiments to provide motor controlled potentiometers which control the settings of the sliding contacts of the potentiometers as a function of measured load conditions.

It should be noted that the oscillation damping circuitry described hereinabove is suitable for synchronous generators which are provided with damper windings. The invention is particularly advantageous for use in super-conducting generators which have practically no damping in the frequency range of interest.

The hereinabove-described exemplary embodiments are illustrative of the application of the principles of the invention. It is to be understood that, in light of this teaching, numerous other arrangements may be devised by persons skilled in the art without departing from the spirit and scope of the invention.

What is claimed is:

1. A circuit for damping hunting oscillations of a controlled electric synchronous machine of the type having a rotor and a stator, the circuit being of the type which determines the hunting oscillation and combines a phase-shifted oscillation correction signal with a control signal of the circuit, the circuit further comprising:
   identification circuit means for producing a first signal having a frequency which corresponds to a frequency of the hunting oscillation and a second signal having said frequency and shifted in phase by 90° with respect to said first signal;
   phase shift means for forming the phase-shifted oscillation correction signal, said phase-shifted oscillation correction signal being shifted in phase with respect to said first and second signals by a selectable amount, said first and second signals being combined with one another in accordance with their respective amplitudes.

2. The circuit of claim 11 wherein said identification circuit means comprises a power measuring circuit for measuring electrical power related to the controlled electric machine.

3. The circuit of claim 1 wherein said measuring means comprises a rotor position transmitter.

4. The circuit of claim 1 wherein said identification circuit means comprises a vector identifier for identifying angle components of the hunting oscillations.

5. The circuit of claim 4 wherein said vector identifier further comprises means for eliminating a steady-state signal component in said first signal.

6. The circuit of claim 1 wherein said identification circuit means comprises a vector filter for identifying angle components of the hunting oscillations.

7. The circuit of claim 1 wherein said phase shift means forms said phase-shifted oscillation correction signal which is shifted in phase with respect to the hunting oscillations by a phase angle which is responsive to a selectable one of a load condition of the controlled electric synchronous machine and an analysis of the hunting oscillations.

8. The circuit of claim 1 wherein there are further provided controller means for controlling electrical conduction through the stator of the controlled electric synchronous machine; and
   comparator means having a first input terminal for receiving said phase-shifted oscillation correction signal, and an output terminal for conducting a fourth signal to said controller means.

9. The circuit of claim 8 wherein said comparator means is provided with a second input terminal for receiving a signal corresponding to a voltage at a network to which the controlled electric synchronous machine is connected.

10. The circuit of claim 1, 2, 3, 4, 5, 6, 7, 8 or 9 wherein the controlled electric synchronous machine is a voltage controlled synchronous generator, said hunting oscillation correction signal being responsive to hunting oscillations of the rotor of said voltage controlled synchronous generator.

* * * * *